O. POPPE & C. VON MICHALKOWSKI.
PROCESS FOR PRODUCING BLOCKS OF COVERING MATERIAL.
APPLICATION FILED FEB. 16, 1916.
1,236,349.   Patented Aug. 7, 1917.
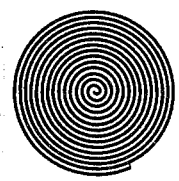
Fig.1.
Fig.1ª.
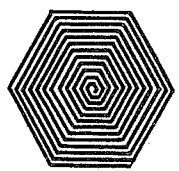
Fig.2.
Fig.3.
Fig.4.
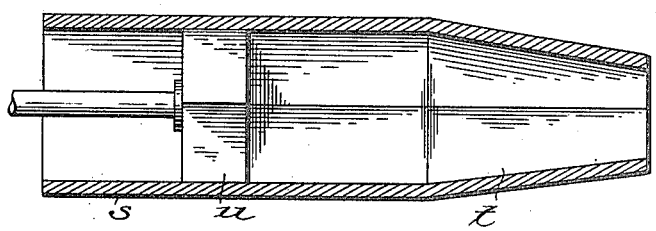
Fig.5.
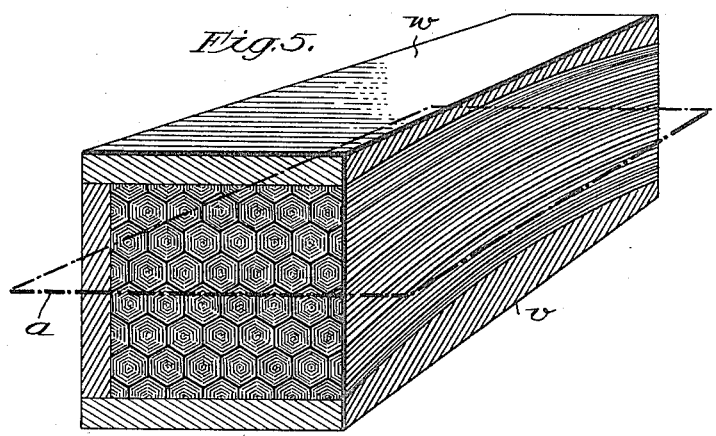
Inventors.
Oscar Poppe and
Curt von Michalkowski,
by Wilkinson, Guista & Mackaye.
Attorneys.

UNITED STATES PATENT OFFICE.

OSCAR POPPE AND CURT von MICHALKOWSKI, OF NEUKÖLLN, NEAR BERLIN, GERMANY.

PROCESS FOR PRODUCING BLOCKS OF COVERING MATERIAL.

1,236,349. Specification of Letters Patent. Patented Aug. 7, 1917.

Application filed February 16, 1916. Serial No. 78,760.

*To all whom it may concern:*

Be it known that we, OSCAR POPPE, doctor philosophy, general manager, and CURT VON MICHALKOWSKI, managing director, both subjects of the German Emperor, and residents of Neukölln, near Berlin, Germany, have invented new and useful Processes for Producing Blocks of Covering Material, of which the following is a specification.

The present invention relates to a process for producing pieces of covering material, which are grained in a woodlike manner through and through. The process, according to the present invention has the object to increase the similarity of the products to real wood further than was hitherto possible by other known processes. The present process employs in particular the known method according to which individual plates of differently colored material, grained or non-grained, are composed in such a manner to form a block, that the parallelism of the plates is destroyed, so that the said plates are disposed in an irregular manner, so that parallel cuts made through the block will transect the individual plates at different angles. This method produces a material which very closely resembles the real article to be imitated, but has the disadvantage, that it is very difficult to obtain the necessary density, so that the cut plates frequently show porous spots.

According to the present invention the similarity to the real natural product is not only increased still further, but also considerable facilitations in the manufacture are secured, and in particular, a perfect density and absence of all porousness of the block is insured.

The new process has been illustrated in the accompanying drawing by aid of the following figures:

Figure 1 shows the initial material, which itself is known, and which, in the instance serving as exemplification, consists of a plate, which has been wound up to a roll, and which itself may be composed of a granular, differently colored material.

Fig. 1ª shows a similar initial material with the difference that a compound plate is employed that is to say, a plate which is composed of two layers. The one layer is made of a uniformly colored material, while the other layer is composed of differently colored, granular material.

Fig. 2 is a cross section of the product shown in Fig. 1, after the subsequent treatment.

Fig. 3 is a similar view after the then following treatment.

Fig. 4 is a diagram showing the press mold in which the product is further treated.

Fig. 5 is a diagram showing the press mold in which the final block is pressed.

The process according to the present invention is as follows:

A sheet of socalled granite or pattern linoleum, that is linoleum, which is composed of differently colored, granular material is rolled up to a roll, as indicated in Fig. 1. This roll is thereupon preferably compressed to a polygonal section, say a square section, or, as shown in Fig. 2, a hexagonal section. Up to here the operations described are already known. A hexagon made according to Fig. 2 will, however, even if rolled up with aid of a cement and under vacuum, nevertheless show a tendency to crack and have air-holes, and may even in places contain holes and cracks.

It has been found that this evil may be obviated if the roll or polygon is reduced to a smaller section by rolling, drawing or some other reducing process. Preferably a press is employed for this purpose as shown in diagram in Fig. 4. At the left end *s* the body of the press has a section which corresponds with the section of the polygon shown in Fig. 2. At the other open end of the body the latter is tapered as shown at *t*, so that at its mouth the section is only such as to correspond to the product shown in Fig. 3. The polygon of material placed into this molding press will be reduced under action of the piston *u*, being at the same time elongated, to such an extent, that the individual layers are absolutely united to form a homogeneous mass. This affords the further advantage that by the elongation of the material the graining will become finer in proportion to the reduction of the section, and that by the choking and crowding of the particles under the force of the advancing piston the material is distorted in its structure, which distortions will very closely resemble the irregularities in the growth of real wood. The bars thus obtained are then packed together in form of a block, and, as shown in Fig. 5, placed into a mold, in which they are compressed to one solid block.

The hereinbefore described operation may also be simplified in such a manner, that the compressing from a round section to a polygonal section, and the stretching into a bar may be combined in one operation of the press (Fig. 4). In this case the entrance to the press would be round, and this round section would gradually change into a polygon in the tapering part of the press body.

A further improvement on the drawings may be obtained, by the bottom $v$ of the mold and also the lid $w$ being arched, so that the individual bars are also deformed longitudinally.

It is known to deform the bars transversely before cutting them up. Such deformation will, however, always produce cut fibers, which run parallel and will therefore destroy the impression of real wood. If, however, the bottom and the lid are arched longitudinally and the bars are consequently curved longitudinally, every sectional plane laid parallel to the plane $a$ (see Fig. 5) will yield products, which have no more parallel fibers, and therefore will have a natural resemblance to real wood.

Furthermore the present process avoids the formation of any waste or cavities. After the block has been compressed it is preferably first cut in the direction of the plane $a$ and then it is glued or welded together in such a manner, that the cut surfaces obtained become the upper and lower surfaces respectively, while the surfaces, which previously were the top and bottom surfaces are glued or welded together. By such means a block of a square section is obtained without any waste, which may be also cut into plates without any waste.

We claim:

1. The process for producing slabs or pieces of covering material from linoleum or the like which are grained in a wood-like manner through and through, which consists in forming a block of superposed plates of different colored material, in elongating said block longitudinally to form a smaller cross section, in compressing a series of said blocks in a mold to form a block of a larger cross section, and finally removing said block from the mold and slicing same longitudinally into slabs, substantially as described.

2. The process for producing slabs or pieces of covering material from linoleum or the like which are grained in a wood-like manner through and through, which consists in forming a block of superposed plates of different colored material, in elongating said block longitudinally to form a smaller cross section, in compressing a series of said blocks in a mold having arched opposite inner walls to form a block of a larger cross section, and curved longitudinally, and finally removing said block from the mold and slicing same longitudinally into slabs, substantially as described.

3. The process for producing slabs or pieces of covering material from linoleum or the like which are grained in a wood-like manner through and through, which consists in forming a block of superposed plates of different colored material, in elongating said block longitudinally to form a smaller cross section, and in compressing a series of said blocks in a mold having arched opposite inner walls to form a block of a larger cross section, and curved longitudinally in cutting the block transversely of its length in suitable slabs, and in joining together the top and bottom surfaces of the remaining portions to form a block from which further pieces are cut, substantially as described.

4. The process for producing slabs or pieces of covering material from linoleum or the like which are grained in a wood-like manner through and through, which consists in forming a block of superposed plates of different colored material, with interposed layers of differently colored granulated material, in elongating said block longitudinally to form a smaller cross section, in compressing a series of said blocks in a mold to form a block of a larger cross section, and finally removing said block from the mold and slicing same longitudinally into slabs, substantially as described.

5. The process for producing slabs or pieces of covering material from linoleum or the like which are grained in a wood-like manner through and through, which consists in forming a block of superposed plates of different colored material, with interposed layers of differently colored granulated material, in elongating said block longitudinally to form a smaller cross section, in compressing a series of said blocks in a mold having arched opposite inner walls to form a block of a larger cross section and curved longitudinally, and finally removing said block from the mold and slicing same longitudinally into slabs, substantially as described.

6. The process for producing slabs or pieces of covering material from linoleum or the like which are grained in a wood-like manner through and through, which consists in forming a block of superposed plates of different colored material, with interposed layers of differently colored granulated material, in elongating said block longitudinally to form a smaller cross section, in compressing a series of said blocks in a mold having arched opposite inner walls to form a block of a larger cross section, and curved longitudinally in cutting the block transversely of its length in suitable slabs, and in joining together the top and bottom surfaces of the remaining portions to form a block from which further pieces are cut, substantially as described.

In testimony, that we claim the foregoing as our invention, we have signed our names, in presence of two witnesses, this eighteenth day of January, 1916.

Dr. OSCAR POPPE.
CURT v. MICHALKOWSKI.

Witnesses:
HENRY HASPER,
ARTHUR SCHROEDER.

Copies of this patent may be obtained for five cents each, by addressing the "Commissioner of Patents. Washington, D. C."